United States Patent [19]
Matasovic, deceased

[11] 4,147,919
[45] Apr. 3, 1979

[54] REMOTE CONTROL PORTABLE WIREFEED ARC WELDING SYSTEM

[76] Inventors: John L. Matasovic, deceased, late of Mokena, Ill., by Stella B. Matasovic, executor, 230 W. Monroe St., Suite 2040, Chicago, Ill. 60606

[21] Appl. No.: 761,697

[22] Filed: Jan. 24, 1977

[51] Int. Cl.² .............................................. B23K 9/10
[52] U.S. Cl. ................... 219/132; 219/130.32
[58] Field of Search .................... 219/131 F, 130, 136, 219/135, 132, 137.31, 137.32, 137.71

[56] References Cited
U.S. PATENT DOCUMENTS

| | | | |
|---|---|---|---|
| 2,843,727 | 7/1958 | Benz, Jr. et al. ................... | 219/130 |
| 3,021,420 | 2/1962 | Ruland, Jr. et al. ............. | 219/131 F |
| 3,079,489 | 2/1963 | Lobosco et al. ................... | 219/130 |
| 3,082,317 | 3/1963 | Adamson et al. .................. | 219/130 |
| 3,109,121 | 10/1963 | Heeny, Jr. ............................ | 219/130 |
| 3,627,977 | 12/1971 | Aldenhoff ............................ | 219/135 |
| 3,895,212 | 7/1975 | Maxwell et al. ..................... | 219/135 |

Primary Examiner—J. V. Truhe
Assistant Examiner—Clifford C. Shaw
Attorney, Agent, or Firm—McCaleb, Lucas & Brugman

[57] ABSTRACT

A remote control unit for closing a normally open contactor in response to closing of a normally open gun switch in a portable wirefeed arc welding system having a power source including the contactor, a portable wirefeed unit, a welding gun, a ground cable interconnecting the power source and the work, an electrode power cable interconnecting the power source and the wirefeed unit and gun, and control leads interconnecting the wirefeed unit with the work and the gun; wherein a capacitor in the control unit is operable to place an override current on the ground and electrode power cables in response to closing of the gun switch, and sensing means comprising a sense relay are operable in response to such override current to effect closing of a normally open cycle hold delay relay and the contactor. The cycle hold delay relay, in turn, closes a fourth or rearming delay relay which opens the circuit to the sense relay. So long as welding current is drawn, the first control relay remains closed to hold the cycle hold delay relay closed. An interruption of welding current for two seconds causes the cycle hold delay relay to time out to open the rearming delay relay and the contactor.

5 Claims, 2 Drawing Figures

REMOTE CONTROL PORTABLE WIREFEED ARC WELDING SYSTEM

BACKGROUND OF THE INVENTION

1. Field of the Invention

This invention relates to arc welding generally, and more particularly to a portable wirefeed arc welding system.

2. Description of the Prior Art

Conventional portable arc welding systems include a welding machine or power source (preferably a D.C. constant voltage type), a portable wire feeding unit with controls, and a welding gun or torch, with electrode power cables from the power source to the wire feeding and control unit and to the gun, a ground cable between the power source and the work, and contractor control and 110 or 115 volt A.C. supply cables between the power source and the portable control unit. The latter cables are hazardous and their maintenance is an important factor in efficiency, productivity and costs, especially in welding on bridges, ships, tanks, pipe lines, or other large structures. Consequently, elimination of those contactor control and 115 volt A.C. supply cables is very desirable.

That has been accomplished with the so-called arc voltage system by using a D.C. motor for the wirefeeder which operates from the low voltage in the welding current cable, but that requires the main contactor to be closed at all times which maintaines the welding cables and welding wire "hot." That is a very dangerous condition, and an accidental touching of the wire or gun tip to the work or surrounding grounded structure will cause instantaneous arcing and probable serious damage to the wirefeed system, such as a "burnback" of the wire into the gun tip, and possible burning of the operator's eyes if his protective helmet is not in place. Further, arcing on critical weldments not only leaves a cosmetic blemish, but also is metallurgically undesirable.

SUMMARY OF THE INVENTION

This invention eliminates the conventional contactor control and 115 volt A.C. supply cables between the portable wirefeed and the power source of an arc welding system without requiring the welding cables and wire to be "hot" at all times. This is accomplished by providing a control unit at the power source including a capacitor operable in response to closing of the gun switch to place an override current on the welding cables, and sensing means operable in response to such override current to effect closing of the power source contactor to supply welding current to the electrode and ground welding cables. In the preferred embodiment of the invention, that sensing means comprises a sense relay which is operable in response to a predetermined override current on the welding cables to close a normally open cycle hold delay relay and the power source contactor to supply welding current to the gun. Closing of the cycle hold delay relay, in turn, closes a rearming delay relay which opens the circuit to the sense relay. If the cycle hold delay relay times out after a predetermined time, preferably two seconds, the circuit to the rearming delay relay is opened at the welding contactor is opened. Until the rearming delay relay thereafter times out (one-half second), the welding cable capacitor cannot re-energize the system which gives any other capacitors time to discharge before rearming the sense relay.

When the power source contactor is closed in response to closing of the gun switch, as above described, and welding current is being drawn, the control sensor effects closing of a control relay which remains closed and holds the cycle hold delay relay closed as long as welding current is drawn. Brief interruptions in the welding, preferably of up to two seconds, can occur, however, without the contactor being opened. But if the welding current is lost for more than two seconds, a rearming sequence must be followed. This provides an inherent and very desirable burnback control.

This control system thus eliminates the use of the conventional contactor control and A.C. supply cables between the power source or welding machine and the portable wirefeed control unit in an arc welding system, while the contactor normally is open, by applying a control current override to the welding electrode and ground cables, in response to initial closing of the gun switch, which is sensed remotely at the welding machine to close the contactor. The gun switch therefore serves the two functions of initially causing closing of the normally open welding contactor and, thereafter, controlling the start-stop wirefeeder motor after welding voltage has been established.

In the drawings:

FIG. 1 is a schematic view of a portable wirefeed arc welding system embodying this invention; and FIG. 2 is a wiring diagram of the preferred remote control unit employed therein.

DESCRIPTION OF THE PREFERRED EMBODIMENT

Figure 1:
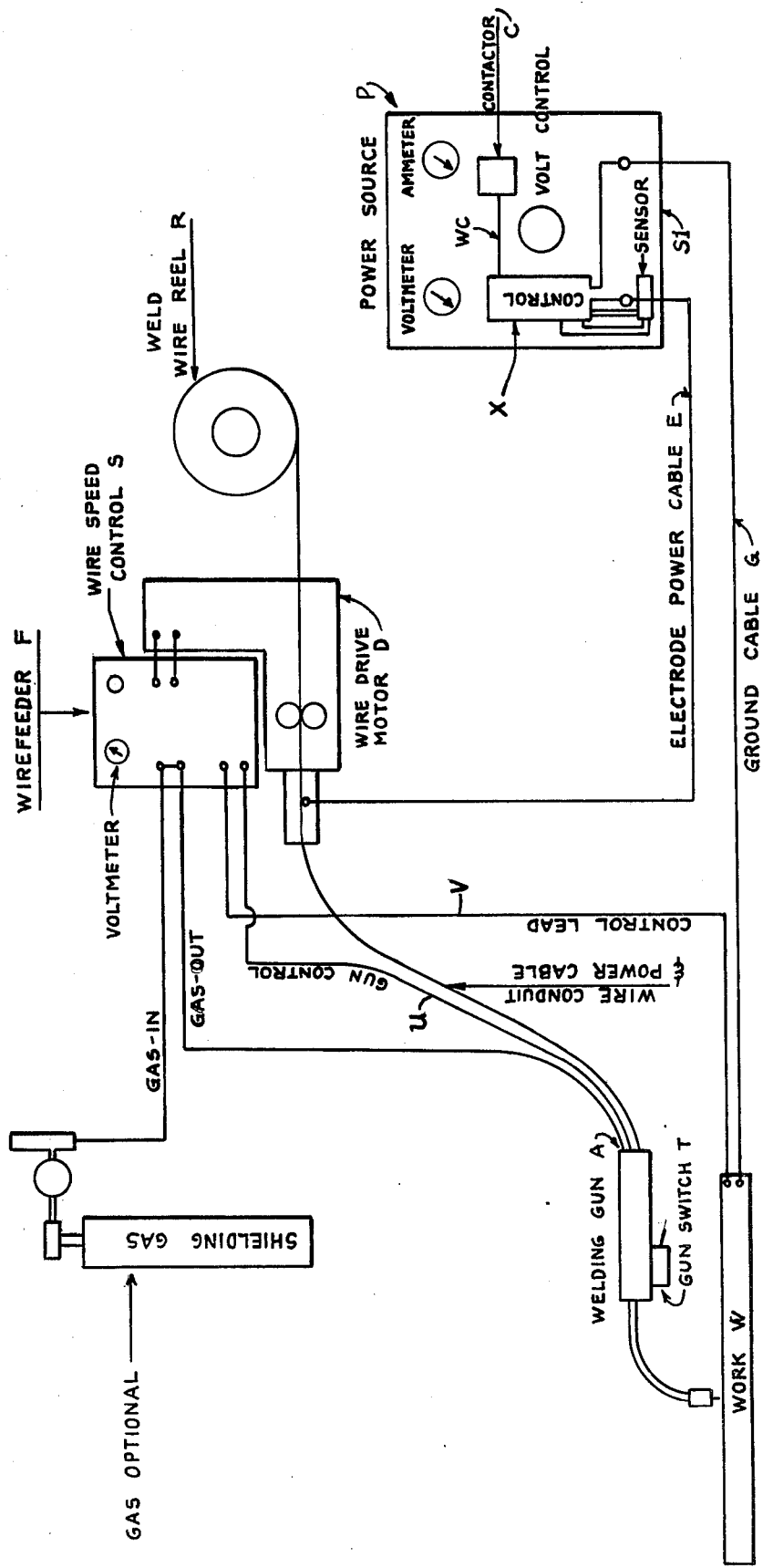

The schematic drawing of FIG. 1 illustrates an arc welding system having a conventional power source P; preferably a D.C. constant voltage type, with a normally open contactor C controlling the usual welding cables comprising a ground cable G from the power source to the work W and an electrode power cable E from the power source to a portable wirefeeder F which includes a wire speed control S, a wire drive motor D and a supply of weld wire on reel R. The weld wire extends with the power cable E through a suitable conduit from the wirefeeder to the welding gun A. The gun switch T is connected in the usual manner with the wire speed control S by a lead U, and a lead V interconnects the control S and the work W. The use of a shielding gas is optional and is illustrated in FIG. 1 as passing through the wirefeeder under the control of a solenoid valve therein in well known manner.

From the preceding it will be noted that the contactor control and 115 volt A.C. supply cables extending between the portable wirefeeder and the power source in the conventional arc welding system are not employed in the present system. Instead, the system of this invention provides a remote control unit, indicated generally by X, which is located at the welding machine or power source P to effect closing of the normally open power source contactor C to supply welding current to the gun A.

Figure 2:
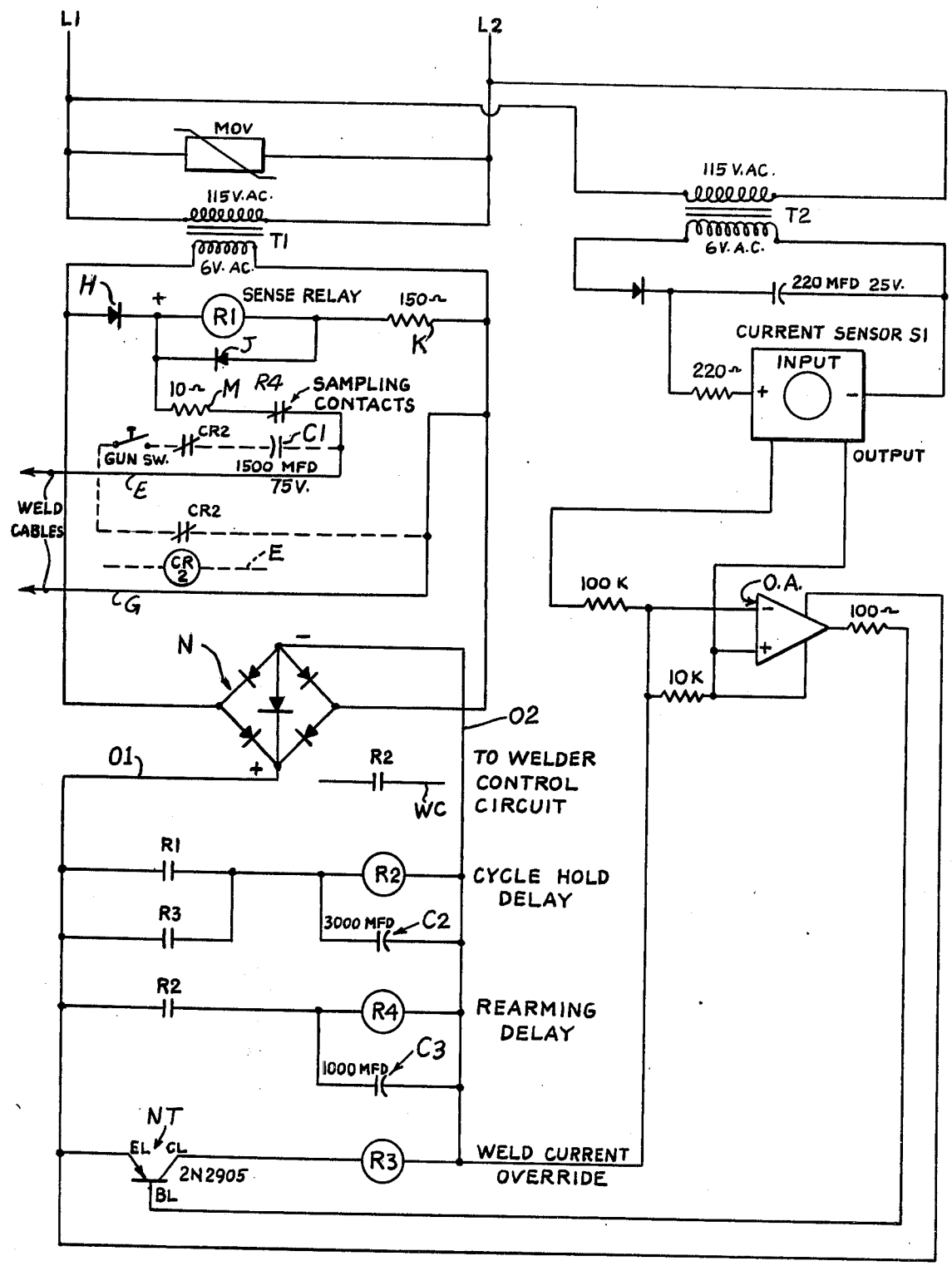

FIG. 2 comprises a wiring diagram of a preferred embodiment of that control unit X which includes two transformers T1 and T2 connected across 115 volt A.C. supply lines L1 and L2. A sense relay R1 is connected across the secondary of transformer T1 with diodes H and J and a 150 ohm resistor K, as illustrated, so that a one-half wave pulsating D.C. voltage is placed across relay R1, but such voltage is not of sufficient magnitude to close that sense relay. The relay R1 also is connected to the welding cable E through a 10 ohm resistor M and normally closed sampling contacts R4. The normally open gun switch T is connected to a 1500 MFD capacitor C1 across the welding cables E, G through normally closed contacts CR2 of a relay CR2. Consequently, when the gun switch T is closed, the 1500 MFD capacitor C1 is placed across the welding cables and the voltage across the sense relay R1 increases sufficiently to close the contacts R1 of the relay.

A full-wave bridge rectifier N is connected across the secondary of transformer T1 and at its positive terminal to a line 01 and at its negative terminal to a line 02. The normally open contacts R1 of the sense relay R1 are connected with a cycle hold delay relay R2 across the lines 01 and 02, as are the normally open contacts R2 of the cycle hold delay relay and a rearming delay relay R4. The normally open contacts R3 of a weld current override relay R3 are connected in parallel with the sense relay contacts R1; and a 3000 MFD capacitor C2 and a 1000 MFD capacitor C3 are connected in parallel, respectively, with the cycle hold delay relay R2, and the rearming delay relay R4.

Therefore, when the contacts R1 of the sense relay R1 are closed in response to closing of gun switch T as previously described, the cycle hold delay relay R2 is actuated to close its contacts R2, which also are in a welder control circuit WC, to effect closing of the contactor C. Such operation of the cycle hold delay relay R2 also actuates rearming delay relay R4 to open its normally closed contacts R4 and the circuit to sense relay R1. When cycle hold delay relay R2 times out, preferably in two seconds, the contactor C is opened and the circuit to rearming delay relay R4 is opened to start its timing out. When relay R4 times out, preferably in one-half second, the capacitor C1 is re-energized and the control circuit is back to normal, the delay occasioned by relay R4 enables any capacitors in the welding machine to discharge before the sense relay R1 can be rearmed.

A brief sequence of the above-described operation is as follows:

1. Gun switch T closing places capacitor C1 across welding cables E, G to provide override current to close sense relay R1.
2. Closing of R1 closes cycle hold delay relay R2 which:
    A. Closes main contactor C.
    B. Closes rearming delay relay R4 which opens circuit to sense relay R1.
3. Opening of R1 contacts starts cycle hold delay relay R2 timing out.
4. If R2 times out:
    A. Contactor C is opened.
    B. The circuit to rearming delay relay R4 is opened to start R4 timing out.

A second portion of the sensing means of the remote control unit X at the welding machine or power source P is a current sensor S1 for sensing the current passing through the welding or electric power cable E. In the preferred embodiment, S1 is a Hall effect sensor which is illustrated in FIG. 1 as surrounding the welding cable E. As shown in FIG. 2, sensor S1 is connected across the secondary of transformer T2 and its output is connected to a conventional operational amplifier OA. A normally non-conductive 2N2905 transistor indicated generally by reference character NT has its emitter lead EL connected to the positive line 01, its base lead BL to the amplifier OA, and its collector lead CL to one side of a relay R3, the other side of which is connected to the negative line 02, in turn connected to the amplifier OA.

Any time a welding current of 50 amperes or more is drawn through the power cable E and, therefore, through the Hall effect sensor S1, sufficient voltage is available on the output of the operational amplifier OA to make transistor NT conductive which closes relay R3. The contacts R3 of the latter are connected in series with the cycle hold delay relay R2 between line 01 and 02, so that their closing by such closing of relay R3 holds relay R2 to prevent its timing out. Brief welding interruptions of extinguishments of the arc for periods of up to two seconds will not result in opening of the contactor C. However, it welding current is lost for two or more seconds, the contactor C will open and the rearming sequence previously set forth herein will follow closing of gun switch T.

As soon as welding voltage is applied to power cable E, relay CR2 is energized to open its normally closed contacts CR2. This transfers control of the gun switch from the capacitor C1 to the usual wirefeeder start-stop circuit through the gun control lead U (FIG. 1), and allows the gun control switch to serve two functions:

A. Initially effect closing of the normally open main contactor.
B. Start-stop wirefeeder motor after welding voltage has been established.

The embodiments of the invention in which an exclusive property or privilege is claimed are defined as follows:

1. In a portable wirefeed arc welding system for depositing metal on a selected piece of work and having a power source including a normally open contactor, a portable wirefeed unit, a welding gun including a normally open gun switch, a ground cable interconnecting said power source and said work, an electrode power cable interconnecting said contactor with said wirefeed unit and said gun, and control leads interconnecting said wirefeed unit with said work and said gun; a remote control unit including a normally inoperative sensing means, a capacitor connected in series with said gun switch across said power cables and said gun switch and capacitor in series being connected in parallel with said sensing means,
   a voltage source,
   means for charging said capacitor from said voltage source in response to closing of the switch to render said sensing means operative to close said contactor for energizing said cables from said power source,
   and means responsive to closure of the contactor to disconnect the capacitor and sense relay from the power cables.

2. In the system according to claim 1, wherein said sensing means includes a sense relay, and wherein said control unit further comprises a normally open cycle hold delay relay closed by operation of said sense relay to close said contactor.

3. In a system according to claim 2, a normally open rearming delay relay closed by said cycle hold delay relay, closure of said rearming delay relay serving to de-actuate said sense relay.

4. In a system according to claim 3, and a current sensor operable in response to welding current to close said cycle hold delay relay, and a time delay capacitor connected in parallel with the latter; whereby interruption of welding current for a predetermined time period serves to open said cycle hold delay relay and said contactor.

5. In a system according to claim 1, in which said voltage source includes an A.C. source, a rectifier in series with said sensing means across the A.C. source and being operable to provide on said cables a rectified voltage of value insufficient to actuate said sensing means, said capacitor being operable to increase the average value of said rectified voltage, said sensing means being operable in response to said increase in voltage to effect closing of said contactor.

* * * * *